US012345377B1

(12) United States Patent
Ting

(10) Patent No.: US 12,345,377 B1
(45) Date of Patent: Jul. 1, 2025

(54) STABLE LIQUEFIED GAS SUPPLY AND HEATING APPARATUS

(71) Applicant: NIPPON SANSO TAIWAN, INC., Hsinchu (TW)

(72) Inventor: Han-Chieh Ting, Taipei (TW)

(73) Assignee: NIPPON SANSO TAIWAN, INC., Hsinchu (TW)

(*) Notice: Subject to any disclaimer, the term of this patent is extended or adjusted under 35 U.S.C. 154(b) by 15 days.

(21) Appl. No.: 18/599,850

(22) Filed: Mar. 8, 2024

(51) Int. Cl.
*F17C 13/02* (2006.01)

(52) U.S. Cl.
CPC .......... *F17C 13/026* (2013.01); *F17C 13/025* (2013.01)

(58) Field of Classification Search
CPC .............................. F17C 13/025; F17C 13/026
See application file for complete search history.

(56) References Cited

U.S. PATENT DOCUMENTS

| | | | | | |
|---|---|---|---|---|---|
| 2,323,763 | A * | 7/1943 | Gregory | F17C 7/04 | 222/3 |
| 2,449,352 | A * | 9/1948 | White | F17C 7/04 | 62/50.2 |
| 5,628,349 | A * | 5/1997 | Diggins | F17C 5/06 | 141/3 |
| 7,152,637 | B2 * | 12/2006 | Hoke, Jr. | F17C 13/026 | 141/192 |
| 8,517,062 | B2 * | 8/2013 | Allidieres | F17C 5/06 | 141/4 |
| 11,371,656 | B2 * | 6/2022 | Ito | H01M 8/04 | |

FOREIGN PATENT DOCUMENTS

| | | | | | |
|---|---|---|---|---|---|
| CN | 114893716 | A | * | 8/2022 | |
| CN | 218626415 | U | * | 3/2023 | |
| CN | 117722592 | A | * | 3/2024 | |
| TW | M636433 | U | * | 1/2023 | G05D 23/32 |

OTHER PUBLICATIONS

CN 114893716 Translation (Year: 2022).*
CN-117722592 Translation (Year: 2024).*
CN-218626415 Translation (Year: 2023).*
TW-M636433 U Translation (Year: 2023).*

* cited by examiner

*Primary Examiner* — Umashankar Venkatesan
(74) *Attorney, Agent, or Firm* — Rabin & Berdo, P.C.

(57) ABSTRACT

A stable liquefied gas supply and heating apparatus includes an electromagnetic heating device installed at an outer bottom side of a gas storage tank to enable quick gasification of a liquefied gas in the gas storage tank into a target gas; a pressure control module and a temperature control module for monitoring the pressure and the temperature of the gas; and a heating control system for controlling the electromagnetic heating device to stably supply the target gas. The electromagnetic heating device includes an ON/OFF switch controllable by a gas supply system, the heating control system, and a gas monitoring system. Therefore, an operator can monitor and control the electromagnetic heating device from different independent spaces to avoid dangerous situations during gas supply, such as losing control of gas temperature and/or pressure or having an abnormal gas temperature.

6 Claims, 12 Drawing Sheets

STABLE LIQUEFIED GAS SUPPLY AND HEATING APPARATUS

FIELD OF THE INVENTION

The present invention relates to a gas supply apparatus for use in a semiconductor manufacturing process, and more particularly, to a gas supply apparatus having multiple safety and monitoring mechanisms.

BACKGROUND OF THE INVENTION

In the process of manufacturing various products in the semiconductor field, such as wafers, panels and light-emitting diodes, some special gases, e.g. $NH_3$, $SiH_4$, $N_2O$ etc., are needed in the course of fabrication. Some of these gases are liquefied gases, such as $NH_3$.

Generally, a gas supply apparatus includes a heating device arranged in an independent space, and a steel cylinder for storing a liquefied gas therein. The steel cylinder is installed on a gas transport pipeline and heated by the heating device, such that the liquefied gas is gasified. The gasified gas is then transported to a gas supply system, such as a gas cabinet, and finally reaches a Point of Use (POU) on a processing machine. These special gases usually contain many dangerous factors, such as being corrosive, spontaneous combustible, or suffocative. Therefore, all the semiconductor manufacturing plants would consider the safe supply of highly pure gas as the most important task.

Currently, there are many commercially available safety protection measures to prevent a heating device from being burned out. For example, a temperature detector or a flame detector is provided on the heating device for detecting overheating or burning of the heating device; and a warning system is provided to remind surrounding workers to shoot troubles in order to prevent the heating device from dangerous conditions, such as gas leakage caused by burning out of the heating device.

However, for the purpose of handling the troubled heating device in real time, the conventional gas supply apparatus normally needs workers who are assigned to stand by the heating device. On the other hand, it is also understood special troubles would not happen frequently in view of the development of highly precision machines. Therefore, it obviously wastes a lot of labor by assigning workers to stand by the heating device all the time.

SUMMARY OF THE INVENTION

A primary object of the present invention is to provide a gas supply and heating apparatus having multiple safety and monitoring mechanisms, so that a heating device of the gas supply apparatus can be independently monitored and controlled at three different positions, including a heating end, a gas supplying end, and a monitoring end, and the whole gas supply and heating apparatus can have even better safety protection means.

Another object of the resent invention is to provide a stable liquefied gas supply and heating apparatus, which includes pressure parameter and temperature parameter that can be repeatedly reset at the heating end according to actual need in wafer fabrication, allowing an operator to timely regulate the gas supply pressure as well as the pressure and temperature conditions of the protection mechanisms.

To achieve the above and other objects, the stable liquefied gas supply and heating apparatus according to a preferred embodiment of the present invention includes a gas supply system, an upstream gas storage system, a gas monitoring system (GMS), and a heating control system. The upstream gas storage system includes a gas storage tank, a transport pipeline, a pressure sensor, a temperature sensor, and an electromagnetic heating device.

The gas supply system includes a gas cabinet and an electrical panel box. The gas cabinet internally includes a gas panel having a plurality of valves, and the electrical panel box includes a control interface for controlling the plurality of valves.

The gas storage tank internally receives a liquefied gas; the transport pipeline is connected to between the gas storage tank and the gas supply system; the pressure sensor is installed on the transport pipeline for detecting changes of gas pressure and continuously generating a current gas pressure value; the temperature sensor is installed on a surface of the gas storage tank for detecting temperature changes of the gas storage tank and continuously generating a current temperature value; and the electromagnetic heating device is installed on an outer bottom side of the gas storage tank and includes a magnetic control unit capable of causing magnetic flux changes and formation of eddy current to enable quick heating of the liquefied gas in the gas storage tank.

The gas monitoring system is electrically connected to the gas supply system for controlling the plurality of valves in the gas panel; the heating control system is electrically connected to the gas supply system, the upstream gas storage system, and the gas monitoring system; the heating control system includes a pressure control module for getting the current gas pressure value, a temperature control module for getting the current temperature value, a human-machine interface electrically connected to the pressure control module and the temperature control module, and a control module electrically connected to the pressure control module, the temperature control module, and the electromagnetic heating device.

The human-machine interface allows an operator to input thereon to change a pressure parameter of the pressure control module, and/or to change a temperature parameter of the temperature control module. The electromagnetic heating device includes an over-limit protection switch that is controlled by the control module to ON/OFF automatically, and an abnormality interrupt switch that can be reset manually only.

When any one of the current temperature value and the current gas pressure value is larger than the temperature parameter or the pressure parameter, respectively, the over-limit protection switch is automatically turned off by the control module, so that the electromagnetic heating device stops heating temporarily. On the other hand, when any one of the current temperature value and the current gas pressure value is smaller than the temperature parameter or the pressure parameter, respectively, the over-limit protection switch is automatically turned on by the control module, so that the electromagnetic heating device starts heating again.

The gas supply system, the gas monitoring system and the human-machine interface can also control the control module directly to turn off the abnormality interrupt switch, so that an operator may turn off the electromagnetic heating device from a remote location.

The heating control system further includes an overheat protection module, the overheat protection module is electrically connected to the electromagnetic heating device to get an operating temperature of the electromagnetic heating device. When the operating temperature exceeds a thermal load of the electromagnetic heating device, the overheat protection module generates a power interrupt signal to the control module for turning off the abnormality interrupt switch, lest the electromagnetic heating device should be burned out due to overheating.

The gas supply system, the gas monitoring system, and the heating control system include a first warning module, a second warning module, and a third warning module, respectively. The pressure parameter includes a pressure warning value, and the temperature parameter includes a temperature warning value. The first, the second and the third warning module generate a first alert notification synchronously when the current gas pressure value exceeds the pressure warning value; and the first, the second and the third warning module generate a second alert notification synchronously when the current temperature value exceeds the temperature warning value.

The temperature warning value and the pressure warning value can be repeatedly reset from an original numerical value to a target numerical value on the human-machine interface.

The stable liquefied gas supply and heating apparatus according to another embodiment of the present invention further includes an auxiliary upstream gas storage system and a weight sensing device. The weight sensing device includes a first weight sensor corresponding to the upstream gas storage system and a second weight sensor corresponding to the auxiliary upstream gas storage system. The control module is further electrically connected to the first weight sensor, the second weight sensor, and the auxiliary upstream gas storage system.

The control module derives a weight different ratio from the first weight sensor and the second weight sensor. When the weight different ratio exceeds a preset numerical value, the control module automatically adjusts the pressure parameter and the temperature parameter to control a first quantity of gasification of the upstream gas storage system and a second quantity of gasification of the auxiliary upstream gas storage system, such that the weight difference ratio is gradually adjusted to be smaller than the preset numerical value.

The present invention is characterized in that the warning modules generate the alert notification synchronously when the upstream gas storage system has any dangerous situation, allowing an operator to check the site of the liquefied gas supply and heating apparatus in real time; and that the electromagnetic heating device can be remotely monitored and turned on or off from any one of the gas supply system, the gas monitoring system, and the heating control system. Therefore, the liquefied gas supply and heating apparatus of the present invention has upgraded overall safety and convenience in use and operators are not required to always stand by the electromagnetic heating device.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
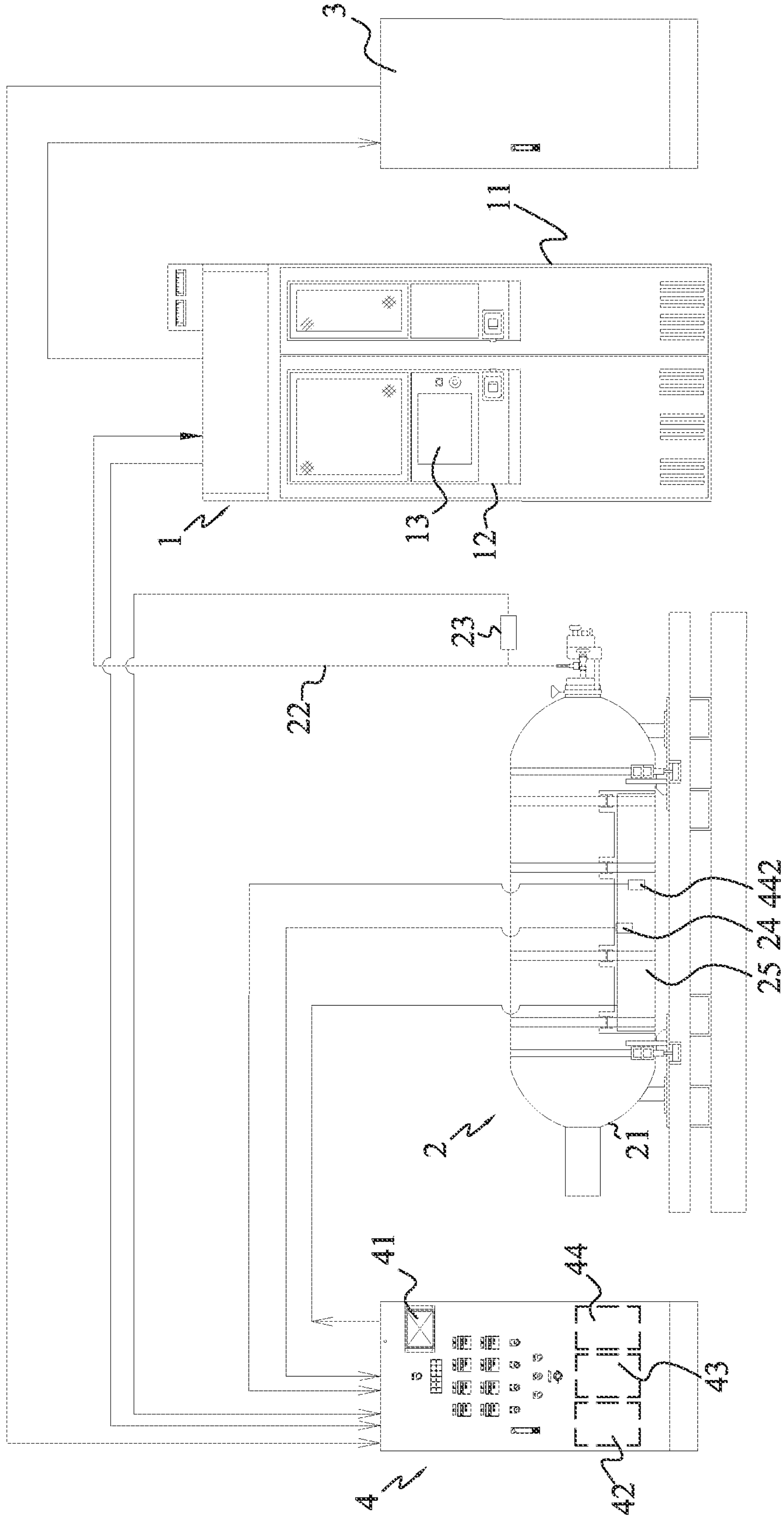
FIG. 1 is a schematic view of a stable liquefied gas supply and heating apparatus according to a first embodiment of the present invention.

The present invention will now be described with some preferred embodiments thereof and by referring to the accompanying drawings. For the purpose of easy to understand, elements that are the same in the preferred embodiments are denoted by the same reference numerals.

The present invention provides a stable liquefied gas supply and heating apparatus, which is configured to gasify a liquefied gas by heating the same, so as to get a target gas having stable saturation pressure and deliver the target gas to a gas supply system, from which the target gas is supplied to a plurality of semiconductor manufacturing equipment.

Please refer to FIG. 1. The stable liquefied gas supply and heating apparatus according to a first embodiment of the present invention includes a gas supply system 1, an upstream gas storage system 2, a gas monitoring system 3, and a heating control system 4. The gas monitoring system 3 is arranged in a monitoring room; and the gas supply system 1, the upstream gas storage system 2 and the heating control system 4 are arranged in a gas room. The monitoring room and the gas room are located in different independent spaces in a semiconductor plant.

The gas supply system 1 is electrically connected to the heating control system 4 and the gas monitoring system 3, and includes a gas cabinet 11 and an electrical panel box 12. The gas cabinet 11 is internally provided with a gas panel having a plurality of valves. The gas panel receives the target gas from the upstream gas storage system 2 and distributes the target gas to the plurality of semiconductor manufacturing equipment. The electrical panel box 12 is connected to the gas cabinet 11 and has a control interface 13 for operating and controlling the open and close of the plurality of valves, so that an operator can supply the target gas to only a part of the plurality of semiconductor manufacturing equipment.

The upstream air storage system 2 includes a gas storage tank 21, a transport pipeline 22, a pressure sensor 23, a temperature sensor 24, and an electromagnetic heating device 25. The gas storage tank 21 has the liquefied gas stored therein; the transport pipeline 22 is connected to between the gas storage tank 21 and the gas supply system 1 for transporting the target gas; the pressure sensor 23 is electrically connected to the heating control system 4 and installed at an end of the transport pipeline 22 closer to the gas storage tank 21 for detecting pressure changes of the target gas in the gas storage tank 21 and continuously generating and transmitting a current gas pressure value 231 to the heating control system 4; the temperature sensor 24 is electrically connected to the heating control system 4 and installed on a surface of the gas storage tank 21 for detecting temperature changes of the gas storage tank 21 and continuously generating and transmitting a current temperature value 241 to the heating control system 4; and the electromagnetic heating device 25 is also electrically connected to the heating control system 4 and installed to an outer bottom side of the gas storage tank 21. The electromagnetic heating device 25 includes a magnetic control unit capable of causing magnetic flux changes for electromagnetically heating the liquefied gas in the gas storage tank 21 at a high speed, so that the liquefied gas is quickly gasified into the target gas.

The gas monitoring system 3 is electrically connected to the gas supply system 1 and the heating control system 4 for monitoring the transporting of the target gas by the plurality of valves of the gas cabinet 11 to the plurality of target semiconductor manufacturing equipment.

Figure 2:
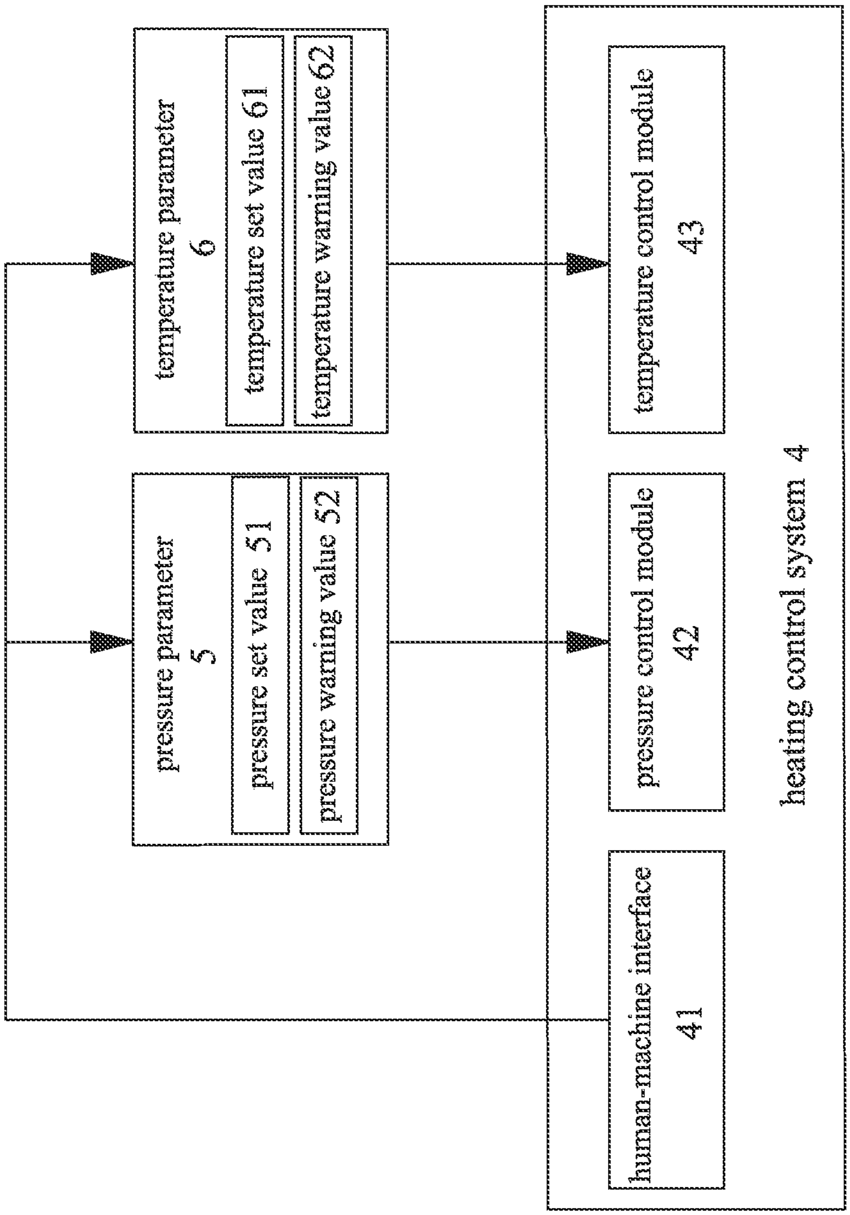
FIG. 2 is a block diagram showing the setting of pressure parameter and temperature parameter on the stable liquefied gas supply and heating apparatus according to the first embodiment of the present invention.
Figure 3:
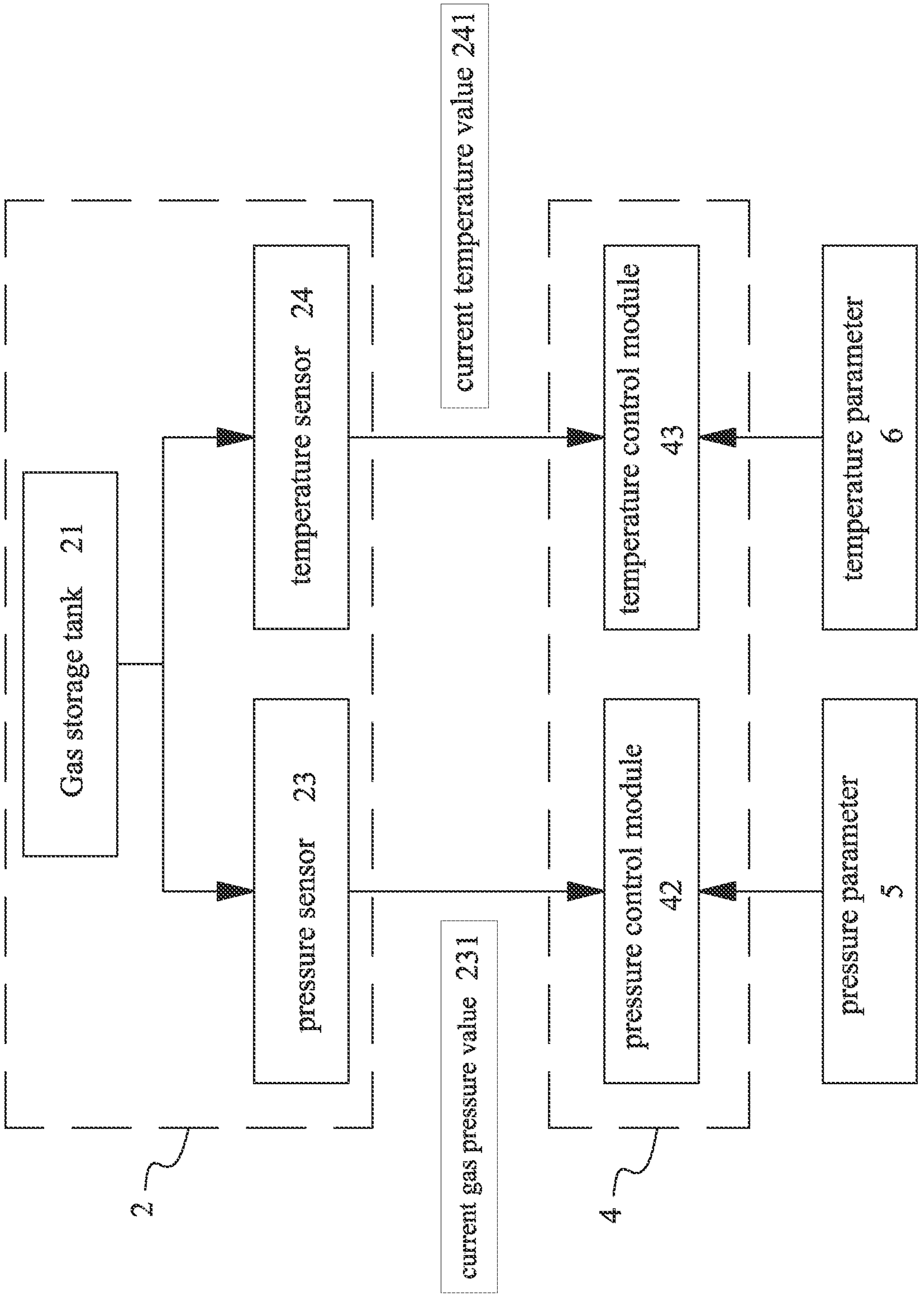
FIG. 3 is a block diagram showing how the stable liquefied gas supply and heating apparatus according to the first embodiment of the present invention transmits current gas pressure value and current temperature value.

Please refer to FIGS. 1, 2 and 3. The heating control system 4 includes a human-machine interface 41, a pressure control module 42, a temperature control module 43, and a control module 44. The human-machine interface 41 is electrically connected to the pressure control module 42 and the temperature control module 43, and allows an operator to manually input thereon to get a pressure parameter 5 and a temperature parameter 6. In a preferred embodiment, the pressure parameter 5 includes a pressure set value 51 and a pressure warning value 52 that is larger than the pressure set value 51; and the temperature parameter 6 includes a temperature set value 61 and a temperature warning valve 62 that is larger than the temperature set value 61.

The pressure control module 42 gets the current gas pressure value 231 from the pressure sensor 23 and displays the current gas pressure value 231 on the human-machine interface 41 of the heating control system 4. The temperature control module 43 gets the current temperature value 241 from the temperature sensor 24 and displays the current temperature value 241 also on the human-machine interface 41 of the heat control system 4. Wherein, the current gas pressure value 231 and the current temperature value 241 indicate the present gas pressure and temperature states, respectively, in the upstream gas storage system 2.

All the pressure set value 51, the pressure warning value 52, the temperature set value 61, and the temperature warning value 62 can be repeatedly reset from an original numerical value to a target numerical value on the human-machine interface 41.

Figure 4A:
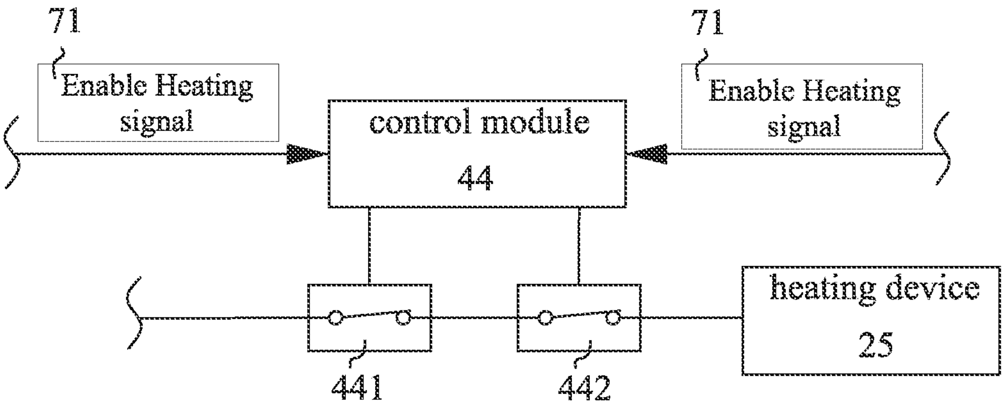
FIGS. 4A to 4C show the procedures of controlling an electromagnetic heating device according to the first embodiment of the present invention.
Figure 4B:
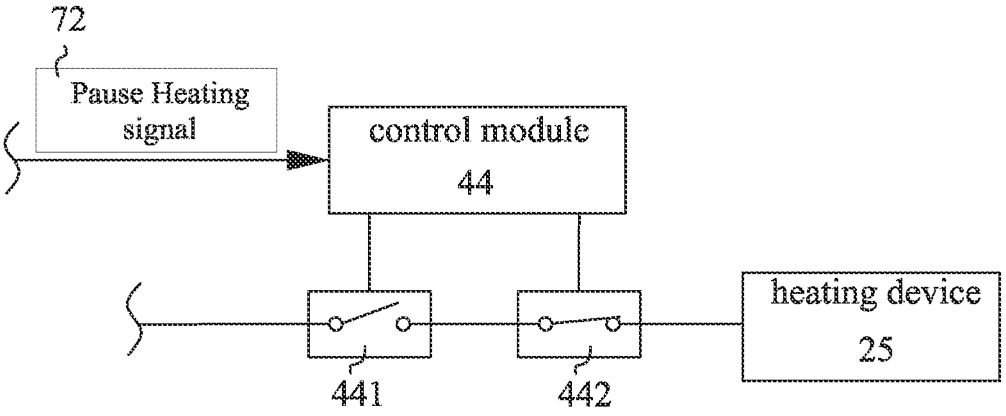
Figure 4C:
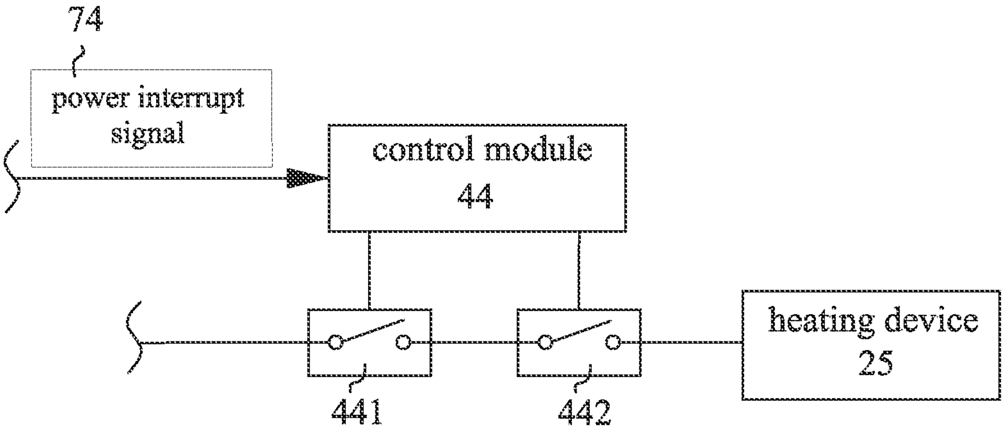

Please refer to FIGS. 4A to 4C. The electromagnetic heating device 25 includes an over-limit protection switch 441 controlled by the control module 44 to ON/OFF automatically; and an abnormality interrupt switch 442 that can be reset manually only. The over-limit protection switch 441 and the abnormality interrupt switch 442 are electrically connected to each other and are serially connected to between the electromagnetic heating device 25 and a power supply. The electromagnetic heating device 25 can operate only when both the over-limit protection switch 441 and the abnormality interrupt switch 442 are ON.

The gas supply system 1, the gas monitoring system 3, and the human-machine interface 41 may control the control module 44 directly to turn off the abnormality interrupt switch 442, so that a user may stop the electromagnetic heating device 25 remotely.

Figure 5:
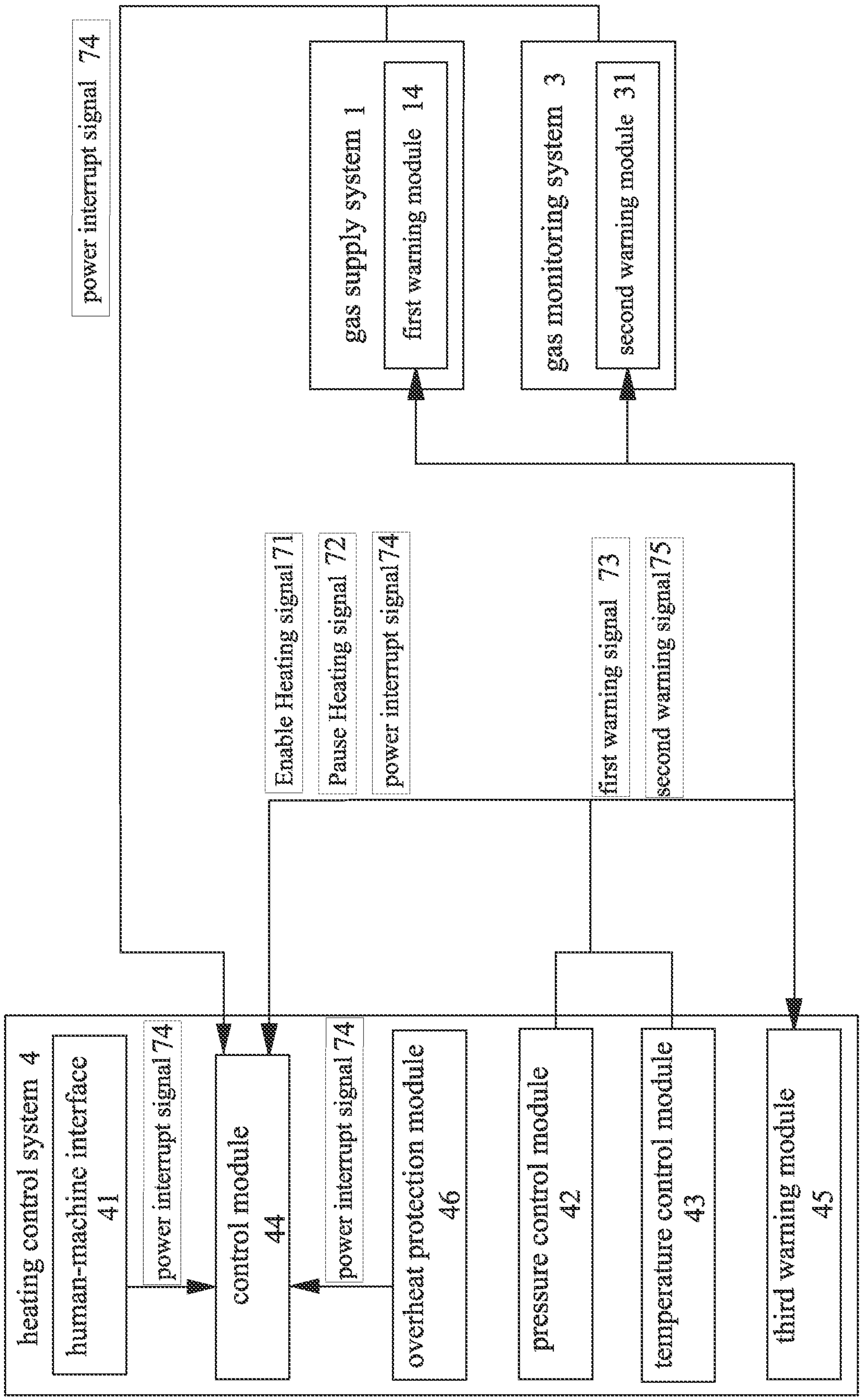
FIG. 5 is a block diagram showing how the stable liquefied gas supply and heating apparatus according to the first embodiment of the present invention transmits control signals.
Figure 6:
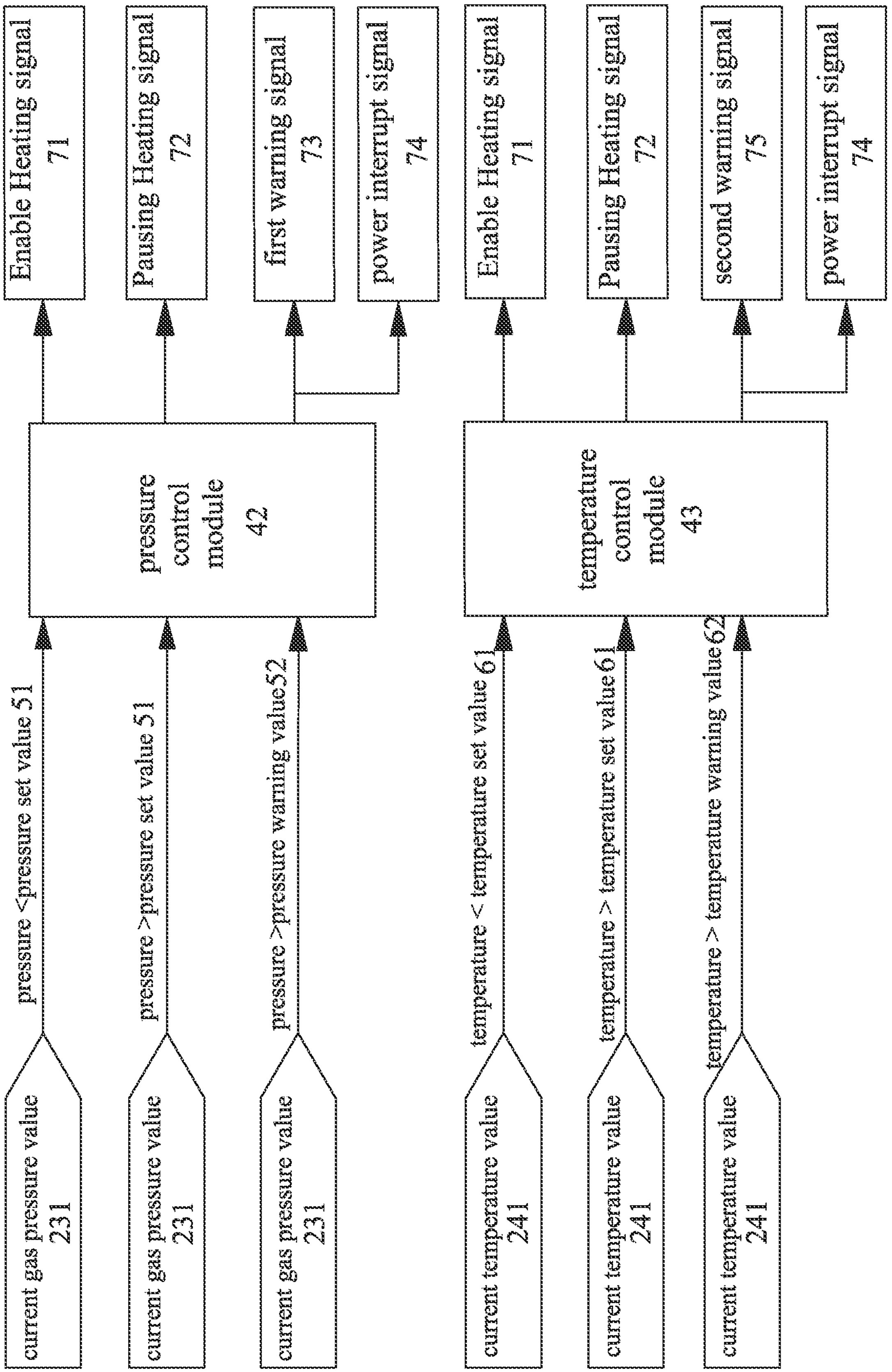
FIG. 6 shows safety protection mechanisms of the electromagnetic heating device according to the first embodiment of the present invention.

Please refer to FIGS. 5 and 6. In the first embodiment, the gas supply system 1 further includes a first warning module 14, the gas monitoring system 3 further includes a second warning module 31, and the heating control system 4 further includes a third warning module 45.

When the current gas pressure value 231 is smaller than the pressure set value 51, the pressure control module 42 will generate an Enable Heating signal 71 to the control module 44. When the current temperature value 241 is smaller than the temperature set value 61, the temperature control module 43 will generate the Enable Heating signal 71 to the control module 44.

When the current gas pressure value 231 is larger than the pressure set value 51, the pressure control module 42 will generate a Pause Heating signal 72 to the control module 44. When the current temperature value 241 is larger than the temperature set value 61, the temperature control module 43 will generate the Pause Heating signal 72 to the control module 44.

The control module 44 controls the over-limit protection switch 441 to ON for the electromagnetic heating device 25 to heat only when the control module 44 receives the Enable Heating signal 71 from both the pressure control module 42 and the temperature control module 43. However, the control module 44 will control the over-limit protection switch to OFF for the electromagnetic heating device 25 to stop heating when the control module 44 receives the Pause Heating signal 72 from any one of the pressure control module 42 and the temperature control module 43.

When the current gas pressure value 231 is larger than the pressure warning value 52, the pressure control module 42 will generate a first warning signal 73 to the first warning module 14, the second warning module 31, and the third warning module 45 at the same time, so that the above three warning modules 14, 31, 45 generate a first alert notification synchronously. At this point, the pressure control module 42 will generate simultaneously a power interrupt signal 74 to the control module 44 for the latter to control the abnormality interrupt switch 442 to Off, so that the electromagnetic heating device 25 is powered off and stops heating until the abnormality interrupt switch 442 is manually reset by an operator for the control module 44 to control the electromagnetic heating device 25 to operate again.

When the current temperature value 241 is larger than the temperature warning value 62, the temperature control module 43 will generate a second warning signal 73 to the first warning module 14, the second warning module 31, and the third warning module 45 at the same time, so that the above three warning modules 14, 31, 45 generate a second alert notification synchronously. At this point, the temperature control module 43 will generate simultaneously the power interrupt signal 74 to the control module 44 for the latter to control the abnormality interrupt switch 442 to Off, so that the electromagnetic heating device 25 is powered off and stops heating until the abnormality interrupt switch 442 is manually reset by an operator for the control module 44 to control the electromagnetic heating device 25 to operate again.

The heating control system 4 further includes an overheat protection module 46, which is able to get an operating temperature from the electromagnetic heating device 25. When the operating temperature is too high, the overheat protection module 46 will generate the power interrupt signal 74 to the control module 44 for the latter to control the abnormality interrupt switch 442 to Off, so that the electromagnetic heating device 25 is powered off and stops heating until the abnormality interrupt switch 442 is manually reset by an operator for the control module 44 to control the electromagnetic heating device 25 to operate again.

Figure 7:
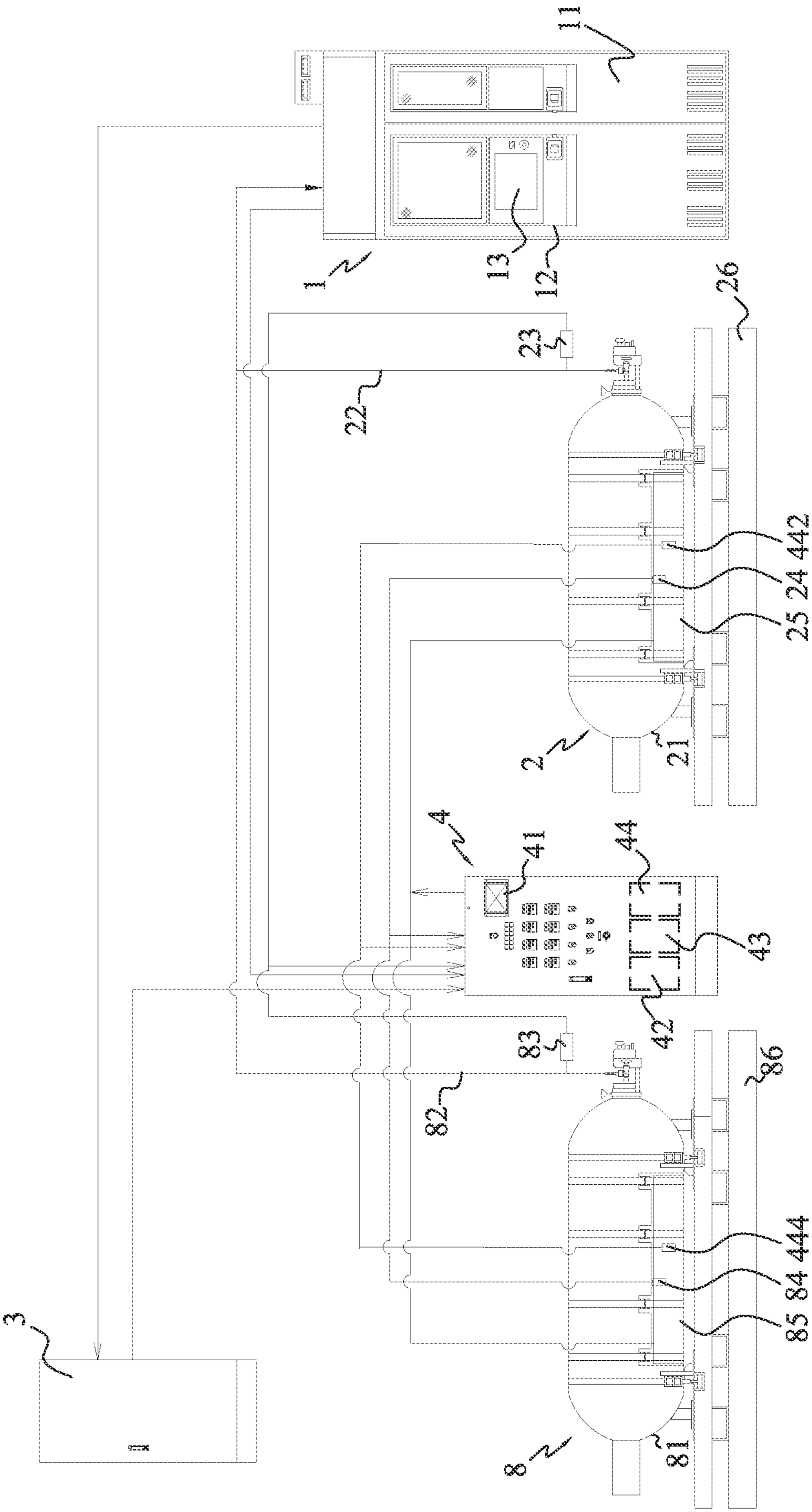
FIG. 7 is a schematic view of a stable liquefied gas supply and heating apparatus according to a second embodiment of the present invention.

Please refer to FIG. 7. The stable liquefied gas supply and heating apparatus according to a second embodiment of the present invention further includes an auxiliary upstream gas storage system 8 and a weight sensor 26 cooperating with the upstream gas storage system 2. The weight sensor 26 is installed below the gas storage tank 21 for detecting weight changes of the gas storage tank 21 and continuously generating and transmitting a weight value 261 to the control module 44.

The auxiliary upstream gas storage system 8 is electrically connected to the electromagnetic heating device 25 and is also arranged in the gas room. The auxiliary upstream gas storage system 8 includes an auxiliary gas storage tank 81, an auxiliary transport pipeline 82, an auxiliary pressure sensor 83, an auxiliary temperature sensor 84, an auxiliary electromagnetic heating device 85, and an auxiliary weight sensor 86 cooperating with the auxiliary upstream gas storage system 8. The auxiliary gas storage tank 81 has the liquefied gas stored therein; the auxiliary transport pipeline 82 is connected to between the auxiliary gas storage tank 81 and the gas supply system 1 for transporting the target gas; the auxiliary pressure sensor 83 is electrically connected to the heating control system 4 and installed at an end of the auxiliary transport pipeline 82 closer to the auxiliary gas storage tank 81 for detecting pressure changes of the target gas in the auxiliary gas storage tank 81 and continuously generating and transmitting an auxiliary current gas pressure value 831 to the heating control system 4; the auxiliary temperature sensor 84 is electrically connected to the heating control system 4 and installed on a surface of the auxiliary gas storage tank 81 for detecting temperature changes of the auxiliary gas storage tank 81 and continuously generating and transmitting an auxiliary current temperature value 841 to the heating control system 4; the auxiliary electromagnetic heating device 85 is also electrically connected to the heating control system 4 and installed to an outer bottom side of the auxiliary gas storage tank 81, the auxiliary electromagnetic heating device 85 includes a magnetic control unit capable of causing magnetic flux changes for electromagnetically heating the liquefied gas in the auxiliary gas storage tank 81 at a high speed, so that the liquefied gas is quickly gasified into the target gas; and the auxiliary weight sensor 86 is installed below the auxiliary gas storage tank 81 for detecting weight changes of the auxiliary gas storage tank 81 and continuously generating and transmitting an auxiliary weight value 861 to the control module 44.

Figure 8:
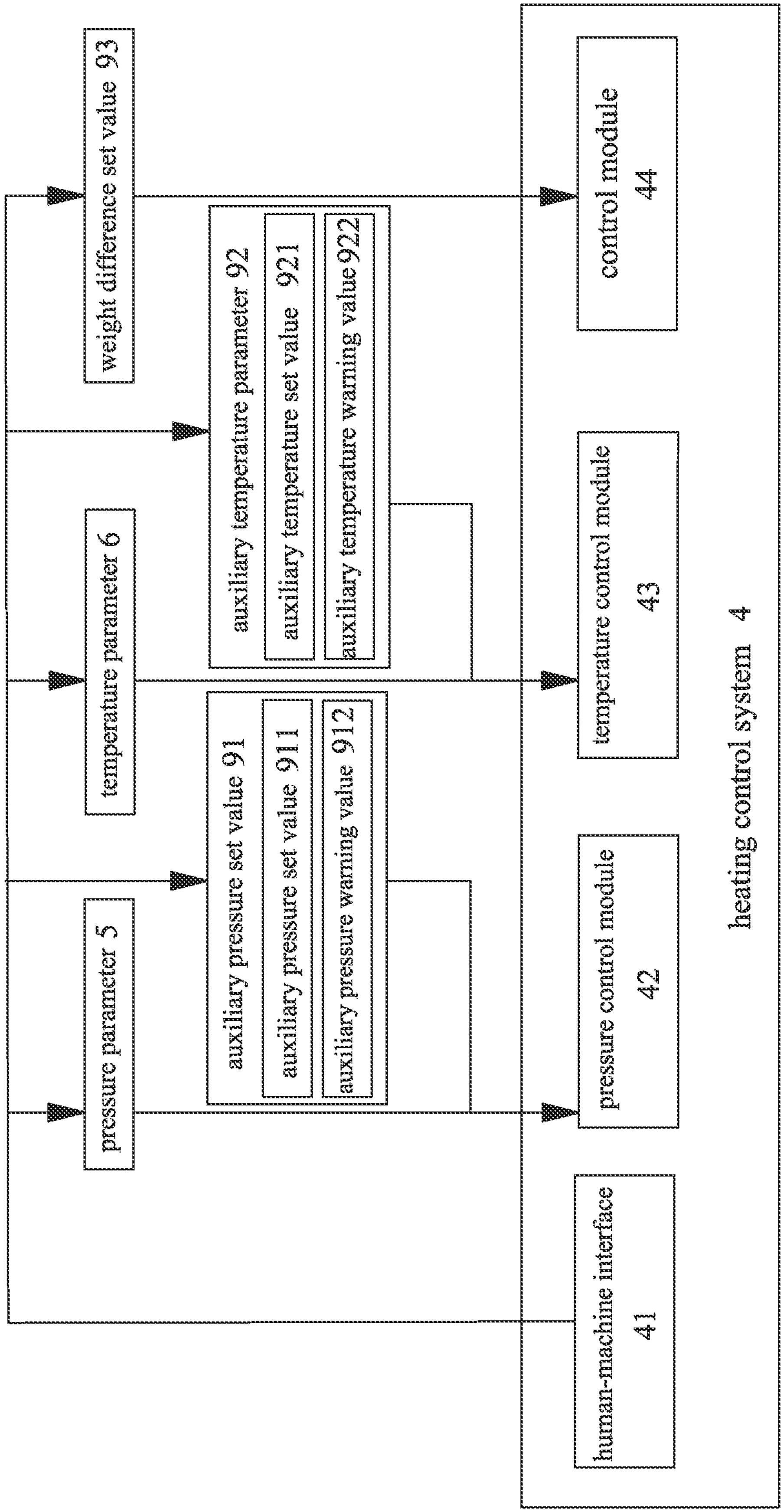
FIG. 8 is a block diagram showing the setting of pressure parameter, temperature parameter and weight difference set values on the stable liquefied gas supply and heating apparatus according to the second embodiment of the present invention.
Figure 9:
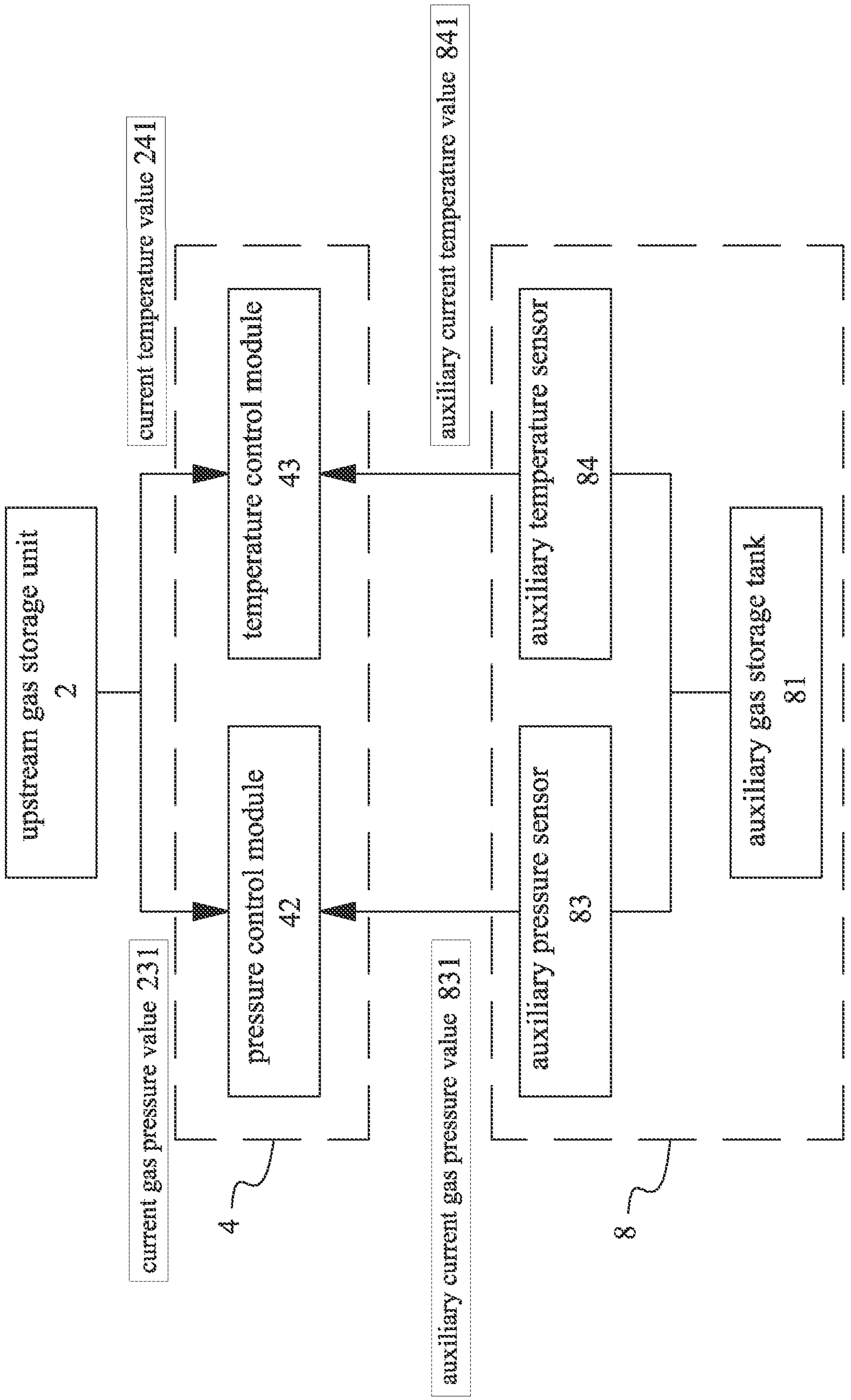
FIG. 9 is a block diagram showing how the stable liquefied gas supply and heating apparatus according to the second embodiment of the present invention transmits current gas pressure value and current temperature value.

Please refer to FIGS. 8 and 9. An operator may input on the human-machine interface 41 to get an auxiliary pressure parameter 91, an auxiliary temperature parameter 92, and a weight difference set value 93. According to a preferred embodiment of the present invention, the auxiliary pressure parameter 91 includes an auxiliary pressure set value 911 and an auxiliary pressure warning value 912; and the auxiliary temperature parameter 92 includes an auxiliary temperature set value 921 and an auxiliary temperature warning value 922.

The pressure control module 42 gets the current gas pressure value 231 and the auxiliary current gas pressure value 831 from the pressure sensor 23 and the auxiliary pressure sensor 83, respectively. The current gas pressure value 231 and the auxiliary current gas pressure value 831 indicate the present pressure state in the upstream gas storage system 2 and the auxiliary upstream gas storage system 8, respectively, and are displayed on the human-machine interface 41 of the heating control system 4.

The temperature control module 43 gets the current temperature value 241 and the auxiliary current temperature value 841 from the temperature sensor 24 and the auxiliary temperature sensor 84, respectively. The current temperature value 241 and the auxiliary current temperature value 841 indicate the present temperature state in the upstream gas storage system 2 and the auxiliary upstream gas storage system 8, respectively, and are displayed on the human-machine interface 41 of the heating control system 4.

The control module 44 gets the weight value 261 and the auxiliary weight value 861 from the weight sensor 26 and the auxiliary weight sensor 86, respectively, and computes the weight value 261 and the auxiliary weight value 861 to derive a weight difference value for comparing with the weight difference set value 93. When the weight difference value is larger than the weight difference set value 93, the control module 44 will go into a gas storage tanks automatic balancing mode, in which the heating temperature of one of the gas storage tank 21 and the auxiliary gas storage tank 81 is changed to increase the quantity of gasification by programmable adjusting one of the pressure parameter 5 and the auxiliary pressure parameter 91 of the pressure control module 42 and one of the temperature parameter 6 and the auxiliary temperature parameter 92 of the temperature control module 43, so as to reduce the weight difference between the gas storage tank 21 and the auxiliary gas storage tank 81.

All the temperature set value 61, the temperature warning value 62, the pressure set value 51, the pressure warning value 52, the auxiliary temperature set value 921, the auxiliary temperature warning value 922, the auxiliary pressure set value 911, the auxiliary pressure warning value 912, and the weight difference set value 93 can be repeatedly reset from another original numerical value to another target numerical value on the human-machine interface 41.

Figure 10A:
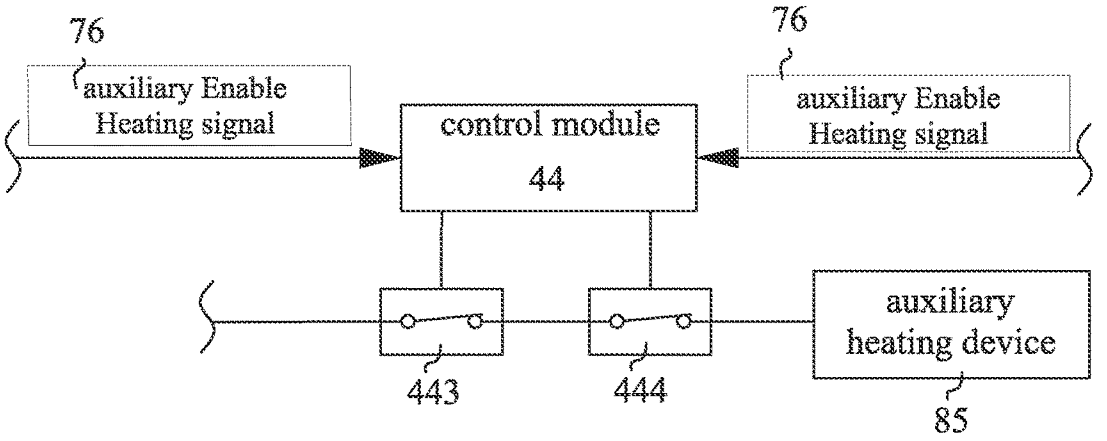
FIGS. 10A to 10C show the procedures of controlling an auxiliary electromagnetic heating device according to the second embodiment of the present invention.
Figure 10B:
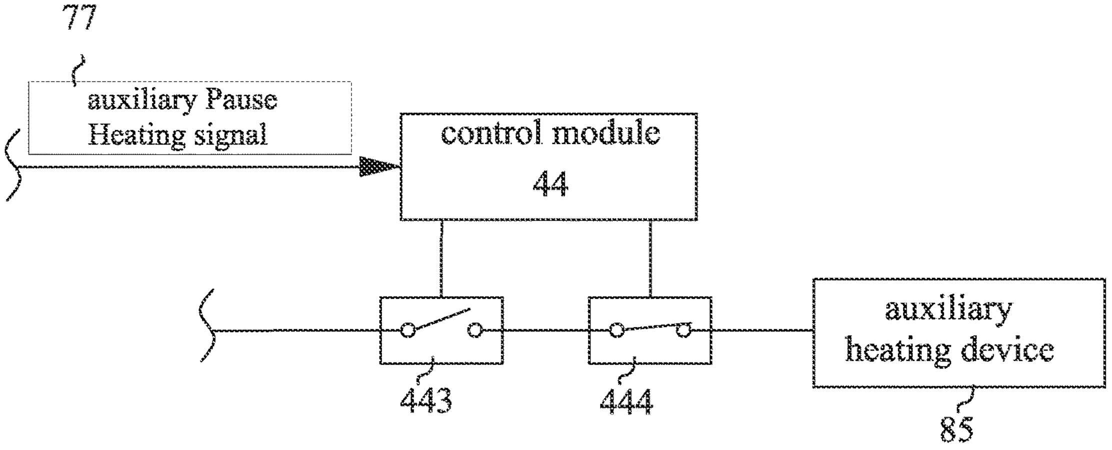
Figure 10C:
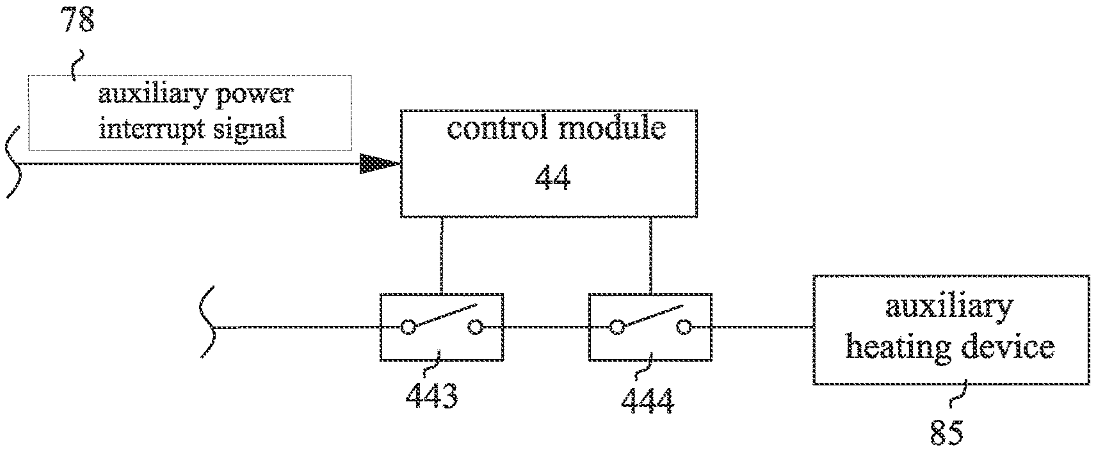

Please refer to FIGS. 10A to 10C. The auxiliary electromagnetic heating device 85 includes an auxiliary over-limit protection switch 443 controlled by the control module 44 to ON/OFF automatically and an auxiliary abnormality interrupt switch 444 that can be reset manually only. The auxiliary over-limit protection switch 443 and the auxiliary abnormality interrupt switch 444 are electrically connected to each other and are serially connected to between the auxiliary electromagnetic heating device 85 and an auxiliary power supply. The auxiliary electromagnetic heating device 85 can operate only when both the auxiliary over-limit protection switch 443 and the auxiliary abnormality interrupt switch 444 are ON.

Figure 11:
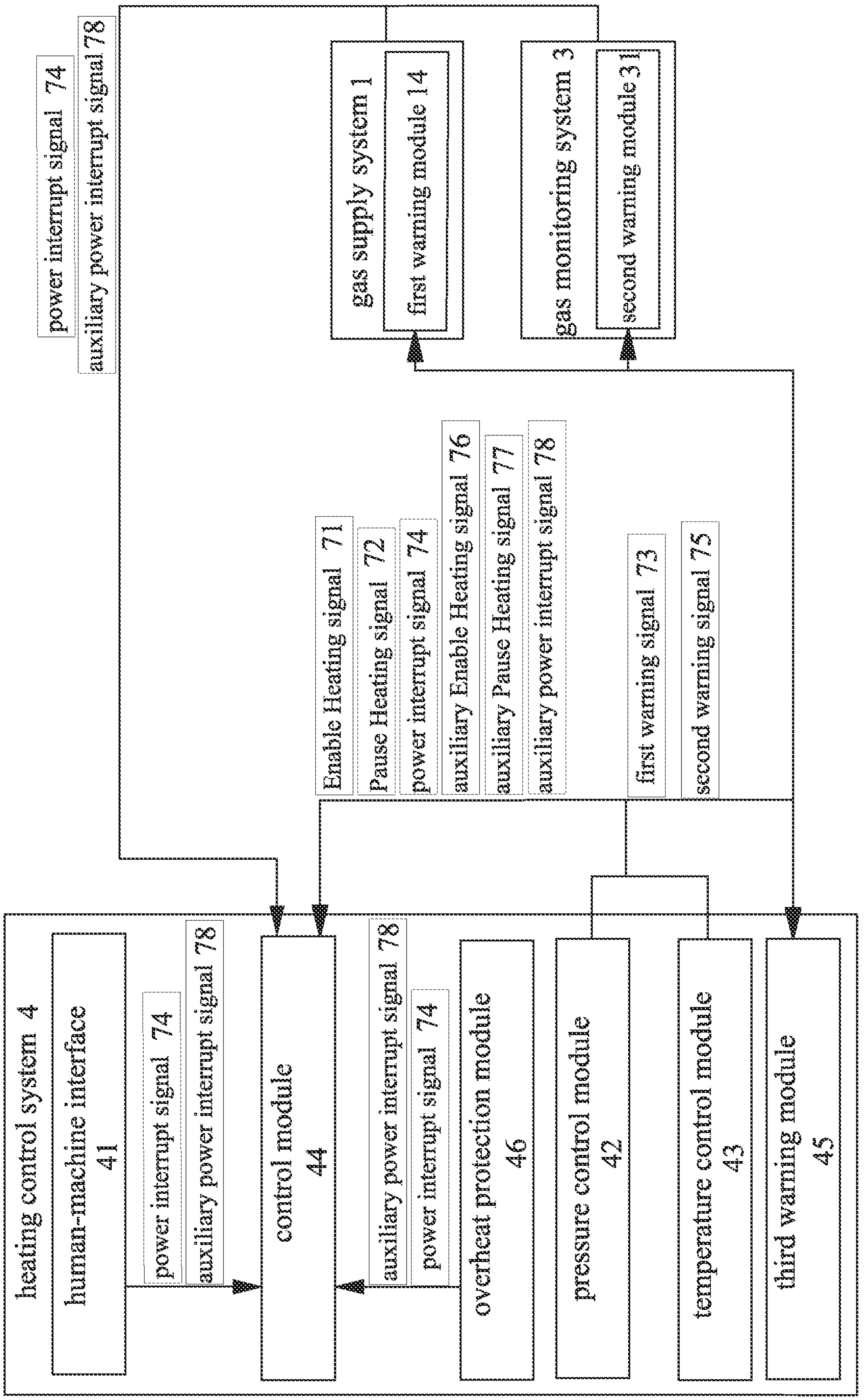
FIG. 11 is a block diagram showing how the stable liquefied gas supply and heating apparatus according to the second embodiment of the present invention transmits control signals.
Figure 12:
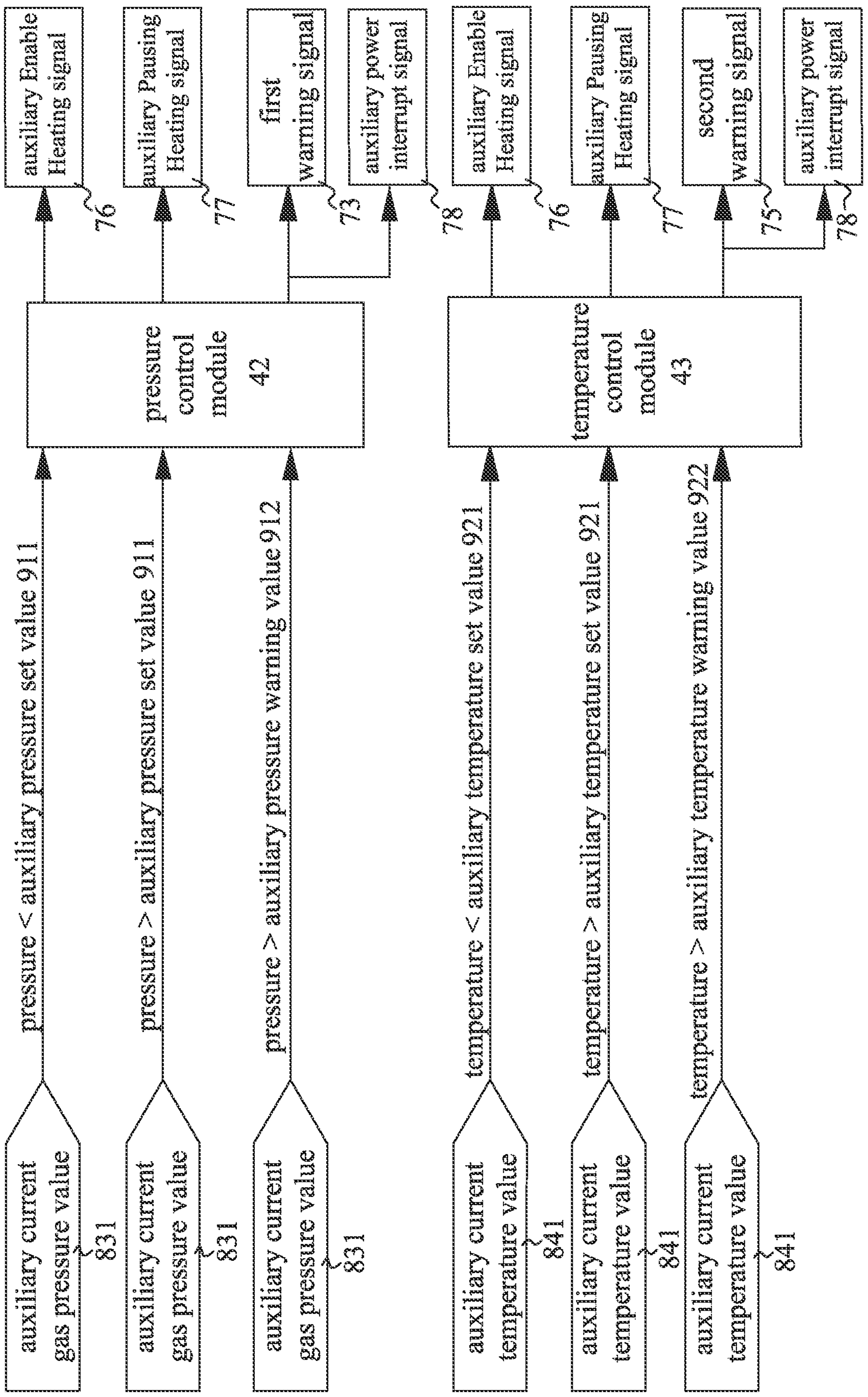
FIG. 12 shows safety protection mechanisms of the auxiliary electromagnetic heating device according to the second embodiment of the present invention.

Please refer to FIGS. 11 and 12. When the auxiliary current gas pressure value 831 is smaller than the auxiliary pressure set value 911, the pressure control module 42 will generate an auxiliary Enable Heating signal 76 to the control module 44. When the auxiliary current gas pressure value 831 is larger than the auxiliary pressure set value 911, the pressure control module 42 will generate an auxiliary Pause Heating signal 77 to the control module 44.

On the other hand, when the auxiliary current temperature value 841 is smaller than the auxiliary temperature set value 921, the temperature control module 43 will transmit the auxiliary Enable Heating signal 76 to the control module 44. When the auxiliary current temperature value 841 is larger than the auxiliary temperature set value 921, the temperature control module 43 will transmit the auxiliary Pause Heating signal 77 to the control module 44.

The control module 44 controls the auxiliary over-limit protection switch 443 to ON for the auxiliary electromagnetic heating device 85 to heat only when the control module 44 receives the auxiliary Enable Heating signal 76 from both the pressure control module 42 and the temperature control module 43. When the control module 44 receives the auxiliary Pause Heating signal 77 from one of the pressure control module 42 and the temperature control module 43, the control module 44 will control the auxiliary over-limit protection switch 443 to OFF for the auxiliary electromagnetic heating device 85 to stop heating.

When the auxiliary current gas pressure value 831 is larger than the auxiliary pressure warning value 912, the pressure control module 42 will generate the first warning signal 73 to the first, the second and the third warning module 14, 31, 45 for them to generate the first alert notification synchronously. At this point, the pressure control module 42 also transmits an auxiliary power interrupt signal 78 to the control module 44 for the latter to control the auxiliary abnormality interrupt switch 444 to OFF, so that the auxiliary electromagnetic heating device 85 is interrupted and stops heating until the auxiliary abnormality interrupt switch 444 is manually reset by an operator for the control module 44 to control the auxiliary electromagnetic heating device 85 to operate again.

When the auxiliary current temperature value 841 is larger than the auxiliary temperature warning value 922, the temperature control module 43 transmits the second warning signal 75 to the first, the second and the third warning module 14, 31, 45 for the three warning modules to generate the second alert notification synchronously. At this point, the temperature control module 43 also transmits the auxiliary power interrupt signal 78 to the control module 44 for the latter to control the auxiliary abnormality interrupt switch 444 to OFF, so that the auxiliary electromagnetic heating device 85 is powered off and stops heating until the auxiliary abnormality interrupt switch 444 is manually reset by an operator for the control module 44 to control the auxiliary electromagnetic heating device 85 to operate again.

The overheat protection module 46 of the heating control system 4 can also get an auxiliary operating temperature from the auxiliary electromagnetic heating device 85. When the auxiliary operating temperature is too high, the overheat protection module 46 will transmit the power interrupt signal 74 to the control module 44 for the latter to control the auxiliary abnormality interrupt switch 444 to OFF, so that the auxiliary electromagnetic heating device 85 is powered off and stops heating until the auxiliary abnormality interrupt switch 444 is manually reset by an operator for the control module 44 to control the auxiliary electromagnetic heating device 85 to operate again.

In the present invention, the pressure parameter 5, the current gas pressure value 231, the temperature parameter 6, the current temperature value 241, the auxiliary pressure parameter 91, the auxiliary current gas pressure value 831, the auxiliary temperature parameter 92, and the auxiliary current temperature value 841 form different safety protection mechanisms and can transmit the first warning signal 73 and the second warning signal 75 to the gas supply system 1, the gas monitoring system 3, and the heating control system 4 to provide multi-monitoring of the upstream gas storage system 2, so that the state of the upstream gas storage system 2 can be controlled in real time and any problem of the upstream gas storage system 2 can also be quickly identified via the first warning signal 73 and the second warning signal 75. Further, the gas supply system 1, the gas monitoring system 3 and the heating control system 4 can directly turn off the abnormality interrupt switch 442 and the auxiliary abnormality interrupt switch 444 from a remote location in response to a lot of dangerous situations.

In an embodiment of the present invention, when an operator is in the monitoring room, the operator may monitor the upstream heating unit 2 via the gas monitoring system 3. In the event the first warning signal 73 and the second warning signal 75 are generated, the operator may go to the operating site and take necessary measures immediately.

In another embodiment of the present invention, when an operator in the gas room finds the gas is leaking out of the gas cabinet 11 and it is necessary to stop producing the target gas immediately, the operator may directly switch off the abnormality interrupt switch 442 via the electrical panel box 12 from a remote location. In this manner, it is able to stop the electromagnetic heating device 25 from operating and stop the production of the target gas.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A stable liquefied gas supply and heating apparatus, comprising:

a gas supply system including a gas cabinet and an electrical panel box; the gas cabinet being internally provided with a gas panel having a plurality of valves; and the electrical panel box having a control interface for controlling the plurality of valves to open or close;

an upstream gas storage system, including:

a gas storage tank storing a liquefied gas;

a transport pipeline connected to between the gas storage tank and the gas supply system;

a pressure sensor installed on the transport pipeline for detecting pressure changes of the gas and continuously generating a current gas pressure value;

a temperature sensor installed on a surface of the gas storage tank for detecting temperature changes of the gas storage tank and continuously generating a current temperature value; and an electromagnetic heating device installed on an outer bottom side of the gas storage tank; the electromagnetic heating device including a magnetic control unit capable of causing magnetic flux changes to form an eddy current that quickly heats the liquefied gas in the gas storage tank;

a gas monitoring system being electrically connected to the gas supply system for controlling the plurality of valves in the gas panel; and a heating control system being electrically connected to the gas supply system, the upstream gas storage system, and the gas monitoring system; the heating control system including a pressure control module for obtaining the current gas pressure value, a temperature control module for obtaining the current temperature value, a human-machine interface electrically connected to the pressure control module and the temperature control module, and a control module electrically connected to the pressure control module, the temperature control module and the electromagnetic heating device;

wherein a pressure parameter of the pressure control module and a temperature parameter of the temperature control module are capable of being changed by the human-machine interface; and the electromagnetic heating device including an over-limit protection switch that is controlled by the control module to ON/OFF automatically, and an abnormality interrupt switch that must be manually reset; and the over-limit protection switch being controlled by the control module to OFF automatically when any one of the current temperature value and the current gas pressure value is larger than any parameter value of the temperature parameter and the pressure parameter, respectively, such that the electromagnetic heating device is caused to stop heating temporarily; on the other hand, the over-limit protection switch being controlled by the control module to ON automatically when the current gas pressure value or the current temperature value is smaller than the parameter value of the pressure or the current parameter, respectively, such that the electromagnetic heating device is brought to heat again; and wherein the control module can also be controlled directly by the gas supply system, the gas monitoring system and the human-machine interface to turn off the abnormality interrupt switch, such that an operator may stop the electromagnetic heating device from a remote location.

2. The stable liquefied gas supply and heating apparatus as claimed in claim 1, wherein the heating control system further includes an overheat protection module, the overheat protection module is electrically connected to the electromagnetic heating device to get an operating temperature of the electromagnetic heating device; the overheat protection module generating a power interrupt signal when the operating temperature exceeds a thermal load of the electromagnetic heating device; and the power interrupt signal being transmitted to the control module for the latter? to control the abnormality interrupt switch to OFF, lest the electromagnetic heating device should burn out due to overheating.

3. The stable liquefied gas supply and heating apparatus as claimed in claim 1, wherein the gas supply system, the gas monitoring system, and the heating control system include a first warning module, a second warning module, and a third warning module, respectively; and wherein the pressure parameter includes a pressure warning value, and the temperature parameter includes a temperature warning value; the first, the second and the third warning module generating a first alert notification synchronously when the current gas pressure value exceeds the pressure warning value; and the first, the second and the third warning module generating a second alert notification synchronously when the current temperature value exceeds the temperature warning value.

4. The stable liquefied gas supply and heating apparatus as claimed in claim 3, wherein the temperature warning value and the pressure warning value can be repeatedly reset from an original numerical value to a target numerical value on the human-machine interface.

5. The stable liquefied gas supply and heating apparatus as claimed in claim 1, further comprising an auxiliary upstream gas storage system and a weight sensing device; the weight sensing device including a first weight sensor corresponding to the upstream gas storage system and a second weight sensor corresponding to the auxiliary upstream gas storage system; and the control module being further electrically connected to the first weight sensor, the second weight sensor, and the auxiliary upstream gas storage system.

6. The stable liquefied gas supply and heating apparatus as claimed in claim 5, wherein the control module derives a weight different ratio from the first weight sensor and the second weight sensor; wherein when the weight different ratio exceeds a preset numerical value, the control module automatically adjusts the pressure parameter and the temperature parameter to control a first quantity of gasification of the upstream gas storage system and a second quantity of gasification of the auxiliary upstream gas storage system, such that the weight difference ratio is gradually adjusted to be smaller than the preset numerical value.

* * * * *